United States Patent
Monk

(10) Patent No.: US 8,397,517 B2
(45) Date of Patent: Mar. 19, 2013

(54) HEATING/COOLING SYSTEM FOR A MOTORCYCLE RIDER

(76) Inventor: Paul Christopher Monk, Surrey (GB)

(*) Notice: Subject to any disclaimer, the term of this patent is extended or adjusted under 35 U.S.C. 154(b) by 972 days.

(21) Appl. No.: 12/087,236

(22) PCT Filed: Nov. 24, 2006

(86) PCT No.: PCT/GB2006/004374
§ 371 (c)(1),
(2), (4) Date: Oct. 21, 2008

(87) PCT Pub. No.: WO2007/077410
PCT Pub. Date: Jul. 12, 2007

(65) Prior Publication Data
US 2009/0308082 A1    Dec. 17, 2009

(30) Foreign Application Priority Data
Dec. 30, 2005    (GB) .................. 0526579.8

(51) Int. Cl.
F25D 21/02    (2006.01)
(52) U.S. Cl. .......................................... 62/3.5
(58) Field of Classification Search .......... 62/3.5, 62/3.3, 259.3; 137/614.02, 614.05; 251/348, 251/152
See application file for complete search history.

(56) References Cited

U.S. PATENT DOCUMENTS

| | | | | |
|---|---|---|---|---|
| 3,566,143 A | * | 2/1971 | Paine et al. | 307/126 |
| 6,109,338 A | * | 8/2000 | Butzer | 165/46 |
| 6,461,379 B1 | * | 10/2002 | Carson et al. | 607/104 |
| 6,510,696 B2 | * | 1/2003 | Guttman et al. | 62/3.3 |
| 6,957,697 B2 | * | 10/2005 | Chambers | 165/297 |
| 7,000,682 B2 | * | 2/2006 | Chambers | 165/46 |
| 2004/0159109 A1 | * | 8/2004 | Harvie | 62/3.5 |
| 2005/0161193 A1 | | 7/2005 | McKenzie | |
| 2006/0027357 A1 | * | 2/2006 | McKenzie et al. | 165/73 |

FOREIGN PATENT DOCUMENTS

| | | |
|---|---|---|
| DE | 19745889 A1 | 4/1999 |
| DE | 202004013089 U1 | 10/2004 |
| EP | 0076077 * | 4/1983 |
| EP | 0389407 A1 | 9/1990 |
| EP | 1080648 A2 | 3/2001 |
| FR | 20805340 | 8/2001 |
| GB | 2106318 A | 4/1985 |
| GB | 2243988 A | 11/1991 |
| GB | 2302793 A | 2/1997 |
| JP | 11-43816 | 2/1999 |
| WO | WO 98/03091 A | 1/1998 |
| WO | WO 99/66274 | 12/1999 |
| WO | WO 2004/111741 A1 | 12/2004 |
| WO | WO2005/055751 A1 | 6/2005 |

* cited by examiner

Primary Examiner — Mohammad Ali
(74) Attorney, Agent, or Firm — Manelli Selter PLLC; Edward J. Stemberger

(57) ABSTRACT

A motorcycle rider is heated by the steps of: transferring heat from atmosphere to a thermally conductive element mounted on a motorcycle by the Peltier effect; and circulating working liquid in a closed cycle from the thermally conductive element, through a garment worn by the motorcycle rider via an inlet coupling thereto and an outlet coupling therefrom, and then back to the thermally conductive element. In an alternative arrangement, a motorcycle rider is cooled by the steps of: circulating working liquid in a closed cycle through a garment worn by the rider via an outlet coupling therefrom, via a thermally conductive element mounted on the motorcycle, and then back to the an inlet coupling to the garment; and transferring heat from the thermally conductive element to atmosphere by the Peltier effect. In either case, both the inlet coupling and the outlet coupling are separable to allow the motorcycle rider to leave the motorcycle while still wearing the garment.

8 Claims, 2 Drawing Sheets

HEATING/COOLING SYSTEM FOR A MOTORCYCLE RIDER

BACKGROUND

This disclosure relates to heating/cooling systems for motorcycle riders, which term includes passengers. As explained below, this involves the provision of special garments that enable heating or cooling of the wearer of that garment.

Motorcyclists necessarily must wear protective clothing to guard against injury should they fall from their vehicle. Such garments are commonly formed of thick leather. A motorcyclist may get uncomfortably hot in hot weather. Equally well, even with the insulating effect of thick leathers, a motorcyclist may get uncomfortably cold in extremely cold weather.

Heating/cooling systems that need to be carried by the wearer of the garment, have been proposed previously, for example for use by the wearer of a space suit, but would not be acceptable for motorcyclists. To be acceptable for motorcyclists, a heating/cooling system would need to be small enough to be mounted on or incorporated into the motorcycle concerned, where weight is a prime limiting condition. The wearer of the garment also needs to be able to attach/detach him/herself to/from the heating/cooling system as they mount/leave the motorcycle to avoid the need to put-on/remove the garment each time they mount/leave the motorcycle.

SUMMARY OF THE DISCLOSURE

In accordance with a first aspect of this disclosure, I provide a method of heating a motorcycle rider by the steps of: transferring heat from atmosphere to a thermally conductive element mounted on a motorcycle by the Peltier effect; and circulating working liquid in a closed cycle from said thermally conductive element, through a garment worn by the motorcycle rider via an inlet coupling thereto and an outlet coupling therefrom, and then back to the thermally conductive element; both the inlet coupling and the outlet coupling being separable to allow the motorcycle rider to leave the motorcycle while still wearing the garment.

In a second and alternative aspect of this disclosure, I provide a method of cooling a motorcycle rider by the steps of: circulating working liquid in a closed cycle through a garment worn by the rider via an outlet coupling therefrom, via a thermally conductive element mounted on the motorcycle, and then back to an inlet coupling to said garment; and transferring heat from the thermally conductive element to atmosphere by the Peltier effect; both the inlet coupling and the outlet coupling being separable to allow the motorcycle rider to leave the motorcycle while still wearing the garment.

According to a third alternative aspect of this disclosure, there is provided a heating/cooling system for a motorcycle rider, comprising: a garment adapted to heat or cool a motorcycle rider wearing the garment, the garment being provided with ducting coupled to an inlet coupling and an outlet coupling and adapted for circulating working fluid from the inlet coupling to the outlet coupling via the said ducting; a thermo-electric device mounted on a motorcycle and having a first face and a second face and adapted to be electrically coupled to a source of direct current mounted on the motorcycle for operatively transferring heat by the Peltier effect from the first face to the second face or vice-versa depending upon the sense of the direct current, the first face being thermally coupled to a metal block exposed to atmosphere, and the second face being thermally coupled to a thermally conductive element through which working fluid from said outlet coupling is adapted to pass in heat exchange relation with said element before passing back to said inlet coupling; a closed cycle working fluid circulation system mounted on the motorcycle, said system comprising the said ducting, and a pump and connections for circulating working fluid from the outlet coupling to and through the thermally conductive element and back to the inlet coupling; and a fan mounted on the motorcycle and adapted to cause passage of atmospheric air past said metal block in heat exchange relation therewith.

Preferably each of the inlet coupling and the outlet coupling respectively comprise a double self-closing valve coupling comprising a first coupling member connected directly to the ducting in the garment and a second coupling member connected to tubing providing said connections in said circulation system, one said coupling member being a male member and the other coupling member being a female member, and each coupling member being provided with an automatic shut-off valve adapted to prevent flow in either direction when the two coupling members are de-coupled from each other, the two coupling members being arranged automatically to open when the two coupling members are coupled together. In the most preferred arrangement, each said coupling member presents a flat face in its de-coupled condition so as to prevent or restrict ingress of dirt, grease or other foreign matter.

Operation of the system may be enhanced by thermal control. This is suitably achieved by mounting a thermistor adjacent to and on the motorcycle side of the outlet coupling in thermally conductive relation with the working fluid Current through the thermistor is adapted to control the direct current passing to the thermo-electric device so as to increase that current when the system is operating in heating mode and the temperature sensed by the thermistor is below a desired range and reducing that current if the temperature sensed by the thermistor is above a desired range. Similarly, when the system is operating in cooling mode and the temperature sensed by the thermistor is below a desired range, then the current through the thermo-electric device is reduced while conversely if the temperature is above a desired range, that current is increased.

BRIEF DESCRIPTION OF THE DRAWINGS

In the drawings, which are by way of example only.

DESCRIPTION OF PREFERRED EMBODIMENTS

Figure 1:
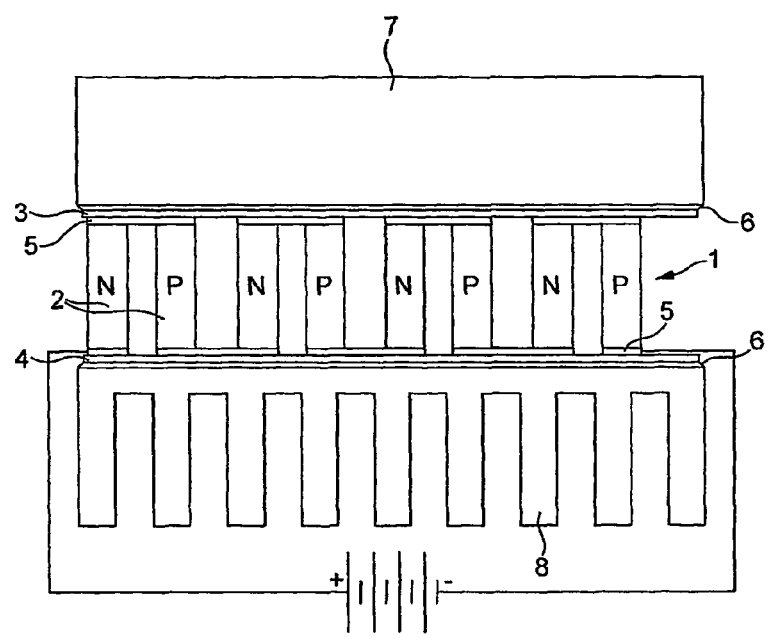
FIG. 1 is a schematic diagram illustrating a thermo-electric device.

A typical thermo-electric device 1, as schematically illustrated in FIG. 1, comprises an array of pairs of respective N-doped and P-doped bismuth telluride pellets 2 sandwiched between respective ceramic plates 3, 4 and electrically connected in series by respective copper traces 5. The ceramic plates 3, 4 act as heat conductors but electrical insulators. They are coupled via a thermal interface material 6 (such as grease, a metallic pad or solder spots) to thermal blocks 7, 8 usually formed of metal. If one block is maintained hotter than the other then an electric current would be produced across the series connected pellets by the Seebeck effect. Alternatively, if a direct current is applied across the series connected pellets, as shown, then heat will be transferred from one thermal block 7 to the other thermal block 8 or in the reverse direction depending upon the polarity of the applied direct current. As shown in the arrangement of FIG. 1, thermal block 7 will be cooled while thermal block 8 will be heated. If heat can be lost from block 8 as a heat sink, for example to atmosphere, then the illustrated apparatus would effectively act as a refrigerator producing cold at thermal block 7. With reverse polarity, the system acts as a heat-pump, thermal block 7 being heated, and the heat being abstracted by thermal block 8 from atmosphere.

Whatever material is employed as the thermal interface material, it should allow for some slight movement between the ceramic plates 3, 4 and the confronting thermal blocks 7, 8 to allow for thermal expansion. Thermo-electric devices are available in which the ceramic plates are provided with metallised surfaces or metallised and pre-tinned surfaces allowing a simple solder connection to the thermal block for best heat conductivity.

Figure 2:
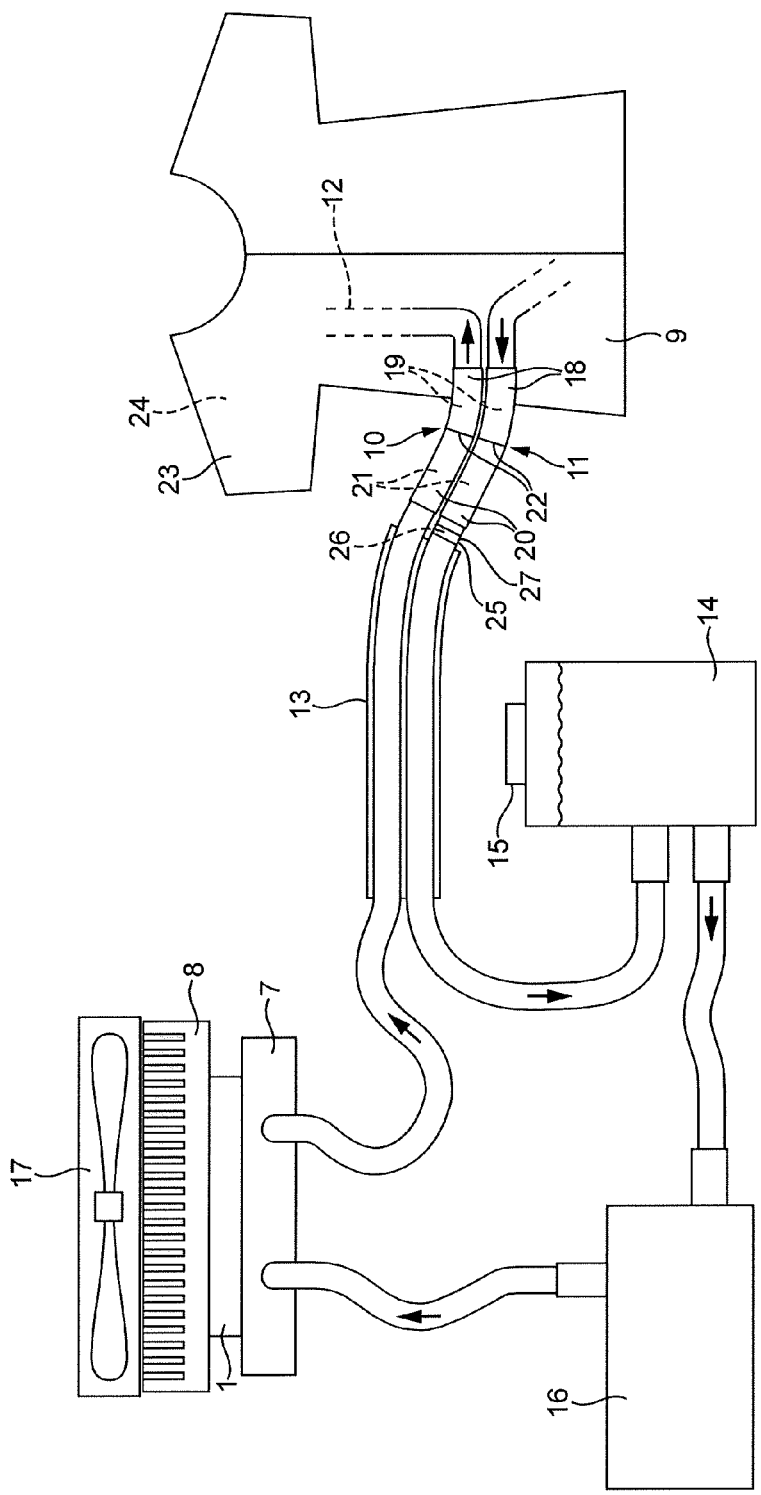
FIG. 2 is a schematic diagram illustrating an embodiment of heating/cooling system for a motorcycle rider.

Turning now to FIG. 2 which illustrates schematically an embodiment of heating/cooling system, a garment 9 is provided with an inlet coupling 10 and an outlet coupling 11. Both the inlet and outlet couplings 10, 11 are comprised of a first coupling member 18 containing an automatic shut-off valve 19 and a second coupling member 20 containing an automatic shut-off valve 21, both coupling members 18, 20 have flat faces 22. Between the inlet coupling 10 and outlet coupling 11 ducting 12 runs within the garment, between an outer layer 23 and an inner layer 24. For heating or cooling a motorcyclist the garment 9 may most conveniently be provided as a vest, shirt or jacket to be worn beneath the outer leathers. Ducting 12 may be provided, for example using silicone-type airline tubing of the kind commonly used in aquaria, for example 6 mm diameter tubing available from Algarde, Nottingham, NG4 2BA. This tubing may simply be sown between two thin cotton layers of the vest and in any suitable pattern. Coupled to the inlet and outlet couplings 10,11 externally of the garment is an umbilical cord 13 which couples the garment to the remaining elements of the apparatus, which are suitably mounted on the motorcycle behind the rider. Between the outlet coupling 11 and the umbilical cord 13 is a temperature control system 25 containing a thermistor 26 and an automatically operable override 27. The working fluid employed in the apparatus is liquid, and suitably water, as this has a much higher thermal capacity than air. While air might theoretically appear to be a suitable working fluid, particularly for cooling a rider, its low thermal capacity means that a considerable volume of air would need to be pumped through the garment in order to have the necessary heating or cooling effect, making the structure too large.

From outlet coupling 11, the aqueous working liquid passes to a reservoir 14 which may be suitably topped up at 15 as necessary. From reservoir 15 the liquid working fluid is pumped by means of pump 16 to thermal block 7 on one side of thermo-electric device 1. A fan 17 causes air to pass across the other thermal block 8 associated with thermo-electric device 1. I have found that this provides adequate heat exchange between atmospheric air and thermal block 8. The working fluid passes from thermal block 7 back through the umbilical tubing 13 to inlet coupling 10.

A range of suitable thermo-electric devices are commercially available, for example from Supercool AB, Gothenburg, Sweden. In preferred embodiments I employ Supercool Modules PE-127-20-15, PE-127-20-25 or PC-128-20-08. Liquid heat exchangers for use as thermal block 7 are also readily available, and adapted specifically for use together with thermo-electric devices, for example from Melcor, Trenton, N.J. A suitable such liquid heat exchanger is Melcor Model LI-301. The preferred thermal interface materials I employ are thin mats formed from natural graphite and a polymer additive. Suitable such mats, which are conveniently supplied with a pressure sensitive adhesive, are available under the Trademark HiTherm in 0.13 and 0.25 mm thicknesses from GrafTech International Ltd. of Lakewood, Ohio. Suitable 12 volt brushless DC plastic fans are available under the Trademark Variofan® from ebm/Papst of Mulfingen, Germany.

Suitable couplings are available from a number of manufacturers. The preferred couplings are quick release couplings which, when released, prevent flow in either direction through the respective coupling members, one of which in each case will be connected to the ducting 12 and the other of which in each case will be connected to the appropriate tubing in the umbilical 13. Colder Products Company of St Paul, Minn. provide a range of inexpensive non-spill high-flow polypropylene quick disconnect couplings. RS Components of Taipei, Hsien, Taiwan also provide a range of quick action couplings suitable for present purposes. However, the most preferred couplings are flat faced couplings which, when disconnected present an effectively flat face at the distal ends of both members of the coupling, preventing or resisting the ingress of grease, dirt and other foreign matter commonly found around motorcycles. The 2FF Series double valve flat face couplings available from Faster SpA of Rivolta d'Adda, Italy are particularly suitable.

A motorcyclist wearing a vest or jacket beneath his normal leathers provided with the heating/cooling system described hereinabove may simply push the respective coupling members together to make the inlet coupling and the outlet coupling, so providing fluid connection between the ducting 12 within his vest or jacket and the external piping in the heating/cooling system. Then by a toggle switch which may be mounted on the handlebars, he can select the polarity of the direct current applied to the thermo-electric device 1 which will automatically connect the pump 16 to heat or cool him depending on his selection.

When the system is used for heating the motorcyclist thermal block 8 will cool and needs to abstract heat from the atmospheric air. As a result, some liquid may condense on thermal block 8 and in extreme conditions this may even freeze. I have found that nonetheless the system works perfectly adequately to heat the rider to the extent required. Because moisture will condense on the thermal block under these conditions, the thermo-electric device 1 may be encapsulated in a suitable potting material to avoid ingress of moisture.

While the rider can simply switch the system off when he has been adequately heated or adequately cooled, a thermal control system is provided A thermistor is mounted adjacent outlet coupling 11 on the motorcycle side effectively to sense the temperature of the working fluid as it exits the garment. If this is higher than a pre-set comfort zone, the current through the thermo-electric device is set to produce cooling. Conversely, if the detected temperature is below a selected comfort zone, the polarity of the current through the thermo-electric device is set to produce heating of the working liquid. Power to the thermo-electric device, the fan and the pump may be supplied through an electronic control unit controlled by the thermistor as explained above. The electronic control unit may also be provided with an override to protect the battery and charging circuits of the motorcycle itself to prevent the heating/cooling system draining the motorcycle battery.

The invention claimed is:
1. A method of heating a motorcycle rider by the steps of: transferring heat from atmosphere to a thermally conductive element mounted on a motorcycle by the Peltier effect; and circulating working liquid in a closed path from said thermally conductive element, through a garment worn by the motorcycle rider via an inlet coupling thereto and an outlet coupling therefrom, and then back to the thermally conductive element; a reservoir for liquid being coupled to said closed path; both the inlet coupling and the outlet coupling being separable to allow the motorcycle rider to leave the motorcycle while still wearing the garment.

2. A method of cooling a motorcycle rider by the steps of: circulating working liquid in a closed path through a garment worn by the rider via an outlet coupling therefrom, via a thermally conductive element mounted on the motorcycle, and then back to an inlet coupling to said garment; a reservoir for liquid being coupled to said closed path; and transferring heat from the thermally conductive element to atmosphere by the Peltier effect; both the inlet coupling and the outlet coupling being separable to allow the motorcycle rider to leave the motorcycle while still wearing the garment.

3. A heating/cooling system for a motorcycle rider, comprising: a garment adapted to heat or cool a motorcycle rider wearing the garment, the garment being provided with ducting coupled to an inlet coupling and an outlet coupling and adapted for circulating working liquid from the inlet coupling to the outlet coupling via the said ducting; a thermo-electric device mounted on a motorcycle and having a first face and a second face and adapted to be electrically coupled to a source of direct current mounted on the motorcycle for operatively transferring heat by the Peltier effect from the first face to the second face or vice-versa depending upon the sense of the direct current, the first face being thermally coupled to a metal block exposed to atmosphere, and the second face being thermally coupled to a thermally conductive element through which working liquid from said outlet coupling is adapted to pass in heat exchange relation with said element before passing back to said inlet coupling; a closed path working liquid circulation system mounted on the motorcycle, said system comprising the said ducting, and a pump and connections for circulating working liquid from the outlet coupling to and through the thermally conductive element and back to the inlet coupling; a reservoir for liquid being coupled to said closed path; and a fan mounted on the motorcycle and adapted to cause passage of atmospheric air past said metal block in heat exchange relation therewith.

4. A heating/cooling system according to claim 3, wherein each of the inlet coupling and the outlet coupling respectively comprise a double self-closing valve coupling comprising a first coupling member connected directly to the ducting in the garment and a second coupling member connected to tubing providing said connections in said circulation system, one said coupling member being a male member and the other coupling member being a female member, and each coupling member being provided with an automatic shut-off valve adapted to prevent flow in either direction when the two coupling members are de-coupled from each other, the two coupling members being arranged automatically to open when the two coupling members are coupled together.

5. A heating/cooling system according to claim 4, in the form of a vest or jacket adapted to be worn beneath protective clothing for motorcycle riders; the ducting being sewn between inner and outer layers of the said vest or jacket.

6. A heating/cooling system according to claim 4, wherein each said coupling member presents a flat face in its de-coupled condition so as to prevent or restrict ingress of dirt, grease or other foreign matter.

7. A heating/cooling system according to claim 3, further comprising a temperature control system comprising a thermistor mounted adjacent the outlet coupling on the motorcycle side in thermally conductive relation with the working fluid, the thermistor being coupled into a control circuit, whereby current through the thermistor is adapted to control direct current passing to the thermo-electric device so as to increase that current when the system is operating in heating mode and the temperature sensed by the thermistor is below a preset range and to reduce that current when the temperature sensed by the thermistor is above a preset range, and so as to increase that current when the system is operating in cooling mode and the temperature sensed by the thermistor is above a preset range and to decrease that current when the temperature sensed by the thermistor is below a preset range.

8. A heating/cooling system according to claim 7, wherein the temperature control system is provided with an automatically operable override adapted to protect the battery and charging circuits of the motorcycle itself by cutting off current to the thermo-electric device when excessive draining of the motorcycle battery is detected.

* * * * *